United States Patent
Lin et al.

(10) Patent No.: US 11,740,672 B2
(45) Date of Patent: Aug. 29, 2023

(54) MULTIPORT USB POWER ADAPTOR AND CONTROL METHODOLOGY

(71) Applicant: Cypress Semiconductor Corporation, San Jose, CA (US)

(72) Inventors: Chuan-yu Lin, Taipei (TW); Jen-Hui Cheng, Taipei (TW); Hua-ping Cao, Shenzhen (CN); Yong-shuang Zhu, Shenzhen (CN); Hsiang-Nien Kuo, Taipei (TW)

(73) Assignee: Cypress Semiconductor Corporation, San Jose, CA (US)

( * ) Notice: Subject to any disclaimer, the term of this patent is extended or adjusted under 35 U.S.C. 154(b) by 92 days.

(21) Appl. No.: 17/387,833

(22) Filed: Jul. 28, 2021

(65) Prior Publication Data

US 2022/0350388 A1 Nov. 3, 2022

Related U.S. Application Data

(60) Provisional application No. 63/182,112, filed on Apr. 30, 2021.

(51) Int. Cl.
*G06F 1/26* (2006.01)
*G06F 13/42* (2006.01)

(52) U.S. Cl.
CPC .......... *G06F 1/266* (2013.01); *G06F 13/4282* (2013.01); *G06F 2213/0042* (2013.01)

(58) Field of Classification Search
CPC . G06F 1/189; G06F 1/26; G06F 1/263; G06F 1/266; G06F 1/28; G06F 1/3296;
(Continued)

(56) References Cited

U.S. PATENT DOCUMENTS

2017/0126133 A1* 5/2017 Yang ................ H02M 3/33576
2018/0198248 A1* 7/2018 Sun ........................ G06F 1/1632
(Continued)

FOREIGN PATENT DOCUMENTS

CN 114784930 A * 7/2022

OTHER PUBLICATIONS

Lowe, Doug. "What Is an Electronic Circuit?". Circuit Analysis for Dummies. Wiley. Online Mar. 26, 2016. Retrieved from Internet Dec. 21, 2022. <https://www.dummies.com/article/technology/electronics/circuitry/what-is-an-electronic-circuit-180191/>. (Year: 2016).*

*Primary Examiner* — Thomas J. Cleary

(57) ABSTRACT

A multiport USB-PD adaptor including a flyback-converter, a USB controller including a USB-PD subsystem and buck-controller, and multiple buck and bypass-circuits, and methods for operating the same are provided. Generally, the adaptor is operated in a buck-bypass-mode, in which at least one buck-circuit is bypassed and the flyback-converter is operated to generate an input voltage ($V_{IN}$) to the buck-circuits equal to a requested output voltage ($V_{OUT\_C}$), which is then coupled directly to the associated port. Buck-circuits coupled to other active ports can also be bypassed if the requested $V_{OUT\_Cs}$ are the same, or the buck-circuits operated to provide another $V_{OUT\_C}$. If a bypass-circuit unavailable, the adaptor is operated in a variable-buck-input-mode by determining a highest $V_{OUT\_C}$ requested on any port and setting $V_{IN}$ to a sum of the highest $V_{OUT\_C}$ and an offset voltage. Buck-circuits coupled to active ports are then operated to provide the requested output voltages.

19 Claims, 12 Drawing Sheets

(58) Field of Classification Search
CPC ............. G06F 13/4068; G06F 13/4282; G06F 2213/0042
See application file for complete search history.

(56) References Cited

U.S. PATENT DOCUMENTS

| | | | | |
|---|---|---|---|---|
| 2019/0149056 | A1* | 5/2019 | Zheng .................. | H02J 7/0036 363/21.13 |
| 2021/0232526 | A1* | 7/2021 | Sultenfuss .......... | G06F 13/4068 |
| 2021/0313889 | A1* | 10/2021 | Zhou ................... | H02M 3/3353 |
| 2022/0302846 | A1* | 9/2022 | Liu ...................... | H02M 3/158 |

* cited by examiner

MULTIPORT USB POWER ADAPTOR AND CONTROL METHODOLOGY

CROSS-REFERENCE TO RELATED APPLICATIONS

This application is claims the benefit of priority under 35 U.S.C. 119(e) to U.S. Provisional Patent Application Ser. No. 63/182,112, filed Apr. 30, 2021, which is incorporated by reference herein in its entirety.

TECHNICAL FIELD

This disclosure relates generally to Universal Serial Bus (USB) power adaptors, and more particularly to multiport USB power adaptors, and control methodology for operating the same.

BACKGROUND

Various electronic devices, such as smartphones, tablets, computers, are configured to receive or transfer power through universal serial bus (USB) connectors according to various USB power delivery protocols defined in a USB Power Delivery (USB-PD) specification. As these devices have become ubiquitous many chargers or power adaptors have begun to include multiple USB ports or sockets. Current multiport USB power adaptors or devices use one of two topologies: a dual-flyback-converter topology, or a combined flyback-converter and buck-converter topology.

A flyback-converter generally includes a controller and a transformer, and is configured to receive an input voltage from a power source coupled to a primary side of the transformer and to provide a second voltage on a secondary side coupled to an output port or socket. The controller is coupled to the transformer via one or more switches, on the primary and/or secondary side and is configured to control the switches to provide a desired secondary voltage. A multiport USB power adaptor using a dual-flyback-converter topology generally includes at least two independent flyback-converters, each coupled in parallel between a power source and separate USB ports or sockets, each independently operated to provide the same or different secondary voltages to the separate USB ports or sockets.

A multiport USB power adaptor using a flyback-buck-controller topology includes a flyback-converter coupled to two or more independent buck-controllers, each coupled to a separate USB port or socket, each buck-controller independently operated to provide the same or different secondary voltages to the separate USB ports or sockets. Typically, one or both of the buck-controllers are operated to provide a voltage to the separate USB ports or sockets lower than an output from the flyback-converter.

Problems or shortcomings with multiport USB power adaptors using a dual-flyback topology include that such adaptors are expensive while at the same time the topology is not readily scalable to more than two ports. Problems or shortcomings with multiport USB power adaptors using flyback-buck topology include that such topology provides lower power efficiency than is specified in current and likely future USB Power delivery specifications.

Accordingly there is a need for multiport USB power adaptors using an inexpensive, power efficient topology that is readily scalable to more than two ports.

SUMMARY

A multiport universal serial bus (USB) power delivery (USB-PD) power adaptor including a flyback-converter, multiple buck-circuits and bypass-circuits, and a USB controller including a USB-PD subsystem and a buck-controller, the USB controller operable to control the USB power adaptor in variable-buck-input-mode, a buck-bypass-mode or both, and methods for operating the same are provided. Generally, the method begins with determining if one or more bypass-circuits each operable to bypass one of the buck-circuits is available. If the bypass-circuit is unavailable the adaptor is operated in a variable-buck-input-mode by determining a highest requested output voltage ($V_{OUT\_C}$) required on any active USB port and setting an input voltage ($V_{IN}$) to the buck-circuits from the flyback-converter to a voltage equal to a sum of the highest requested $V_{OUT\_C}$ and an offset voltage ($V_{OS}$). If other active USB port or ports require other, lower requested voltages, the buck-controller and external buck-circuit(s) associated with these ports can be enabled and operated by the USB-PD subsystem to provide other, lower $V_{OUT\_Cs}$.

If a bypass-circuit is available the adaptor is operated in a buck-bypass-mode, in which at least one buck-circuit is bypassed and the flyback-converter is operated to generate $V_{IN}$ equal to the requested output voltage, which is then coupled directly to the associated USB port through the bypass-circuit. Buck-controllers coupled to other active USB ports can also be bypassed if the $V_{OUT\_Cs}$ are the same, or the buck-controllers can be operated to provide other, lower $V_{OUT\_Cs}$.

Generally, the USB ports include USB Type-C (USB-C) ports, and target or requested output voltages can include one or more of 5V, 9V, 12V, 15V or 20V. The offset voltages ($V_{OS}$) can include a predetermined voltage drop across a buck-circuit for a given or maximum specified output current, and is generally determined by a maximum duty cycle supported by the buck-controller and buck-circuits, and can include, for example, about 1V offset voltage.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

A multiport universal serial bus (USB) power delivery (USB-PD) power adaptor including a flyback-converter, multiple buck-circuits and bypass-circuits, and a USB controller including a USB-PD subsystem and a buck-controller, the USB controller operable to control the USB power adaptor in variable-buck-input-mode, a buck-bypass-mode or both, and methods for operating the same are disclosed.

In the following description, for purposes of explanation, numerous specific details are set forth in order to provide a thorough understanding of the present invention. It will be evident, however, to one skilled in the art that the present invention can be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein can include both to directly electrically connect two or more components or elements and to indirectly connect through one or more intervening components.

Figure 1A:
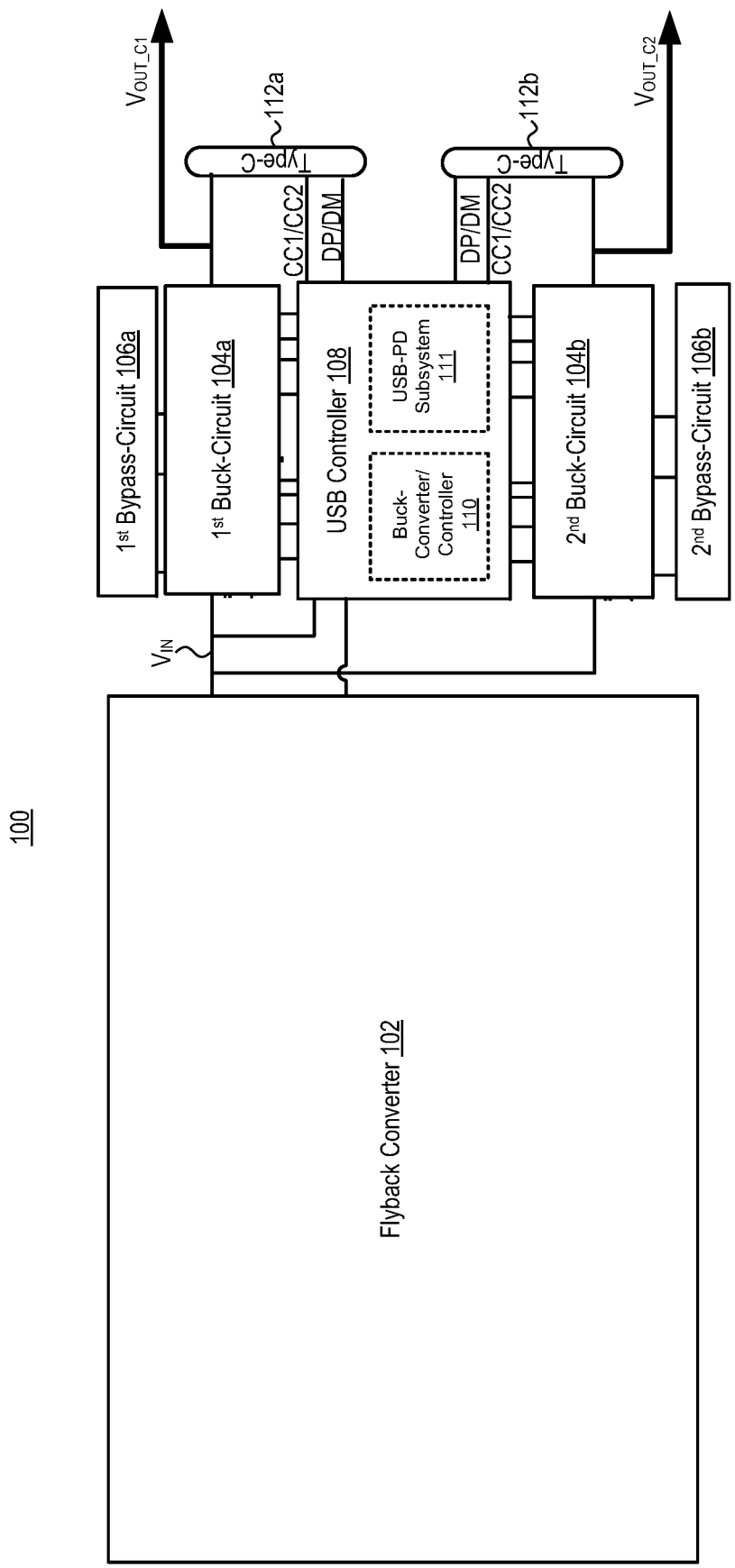
FIG. 1A is a block diagram illustrating a multiport universal serial bus (USB) power delivery (USB-PD) power adaptor in accordance with exemplary embodiments of the present disclosure.

FIG. 1A is a block diagram of an embodiment of a multiport USB power adaptor 100 including a flyback-converter 102, multiple buck-circuits 104a, 104b, multiple bypass-circuits 106a, 106b, each operable to bypass one of the buck-circuits, and a USB controller 108, including a buck controller 110 and a USB-PD subsystem 111. The buck controller 110 can be integrally formed in the USB controller 108, as shown, as part of a DC/DC-controller or subsystem, or can be external to the USB controller. In the embodiment shown the multiport USB power adaptor 100 includes only two USB ports 112a, 112b, however it will be understood that other embodiments including a more number of USB ports are supported by the methods and architecture of the present invention. Generally, each of the USB ports 112a, 112b, are coupled to an output of the flyback-converter 102 through one of the buck-circuits 104a, 104b, and to the USB controller 108 through one or more CC lines and DP/DM lines.

The flyback-converter 102 is operable to receive and convert a first AC or DC voltage to a second DC voltage. Each of the buck-circuits 104a, 104b, coupled between the flyback-converter 102 and one of the USB ports 112a, 112b, are operable by the buck-controller 110 to receive an input voltage ($V_{IN}$) from the flyback-converter and to output a target voltage ($V_{OUT\_C1}$, or $V_{OUT\_C2}$) to one of the USB ports. More specifically, the buck controller 110 is operable to independently control each of the external buck-circuits 104a, 104b, to provide the requested or targeted $V_{OUT\_C1}$, or $V_{OUT\_C2}$, on each USB ports 112a, 112b. It will be understood that output voltages $V_{OUT\_C1}$ and $V_{OUT\_C2}$ need not be the same, and both of the USB ports 112a, 112b need not be active, that is have a device connected to the port, at the same time. The USB controller 108 is coupled to the flyback-converter 102, the buck-circuits 104a, 104b, the bypass-circuits 106a, 106b, and to the USB ports 112a, 112b. The USB-PD subsystem 111 in the USB controller 108 is operable to control or operate the flyback-converter 102, and, in conjunction with the buck-controller 110, to operate the USB power adaptor 100 in a variable-buck-input-mode or a buck-bypass mode.

In variable-buck-input-mode the USB-PD subsystem 111 controls the flyback-converter 102 to generate an input voltage ($V_{IN}$) into the external buck-circuits 104a, 104b, determined by an offset voltage ($V_{OS}$) and the higher of a highest requested output voltage ($V_{OUT\_C1}$, or $V_{OUT\_C2}$) or a voltage determined from a power drawn on both ports in Watts (Wattage_C1, Wattage_C2) relative to a maximum current (Imax) supported by the USB power adaptor 100. If only one of the USB ports 112a is active or connected to a first device, the USB-PD subsystem 111 operates the flyback-converter 102 to generate a $V_{IN}$ equal to a sum of $V_{OS}$ and the requested $V_{OUT\_C1}$ If the second USB port 112b is also connected to a second device, the USB-PD subsystem 111 operates the flyback-converter 102 to generate and couple to the first and second external buck-circuits 104a, 104b, a $V_{IN}$ equal to a sum of $V_{OS}$ and a greater of $V_{OUT\_C1}$, or $V_{OUT\_C2}$, and the first and second buck-circuits 104a, 104b are enabled and operated to output $V_{OUT\_C1}$ to the first USB port 112a and $V_{OUT\_C2}$ to output to the second USB port 112b.

In buck-bypass-mode with a single USB port 112a active the USB-PD subsystem 111 of the USB controller 108 controls the flyback-converter 102 to generate a $V_{IN}$ equal to $V_{OUT\_C1}$ which is coupled to the first USB port through the first bypass-circuit. If the second USB port 112b is also connected to a second device, the USB-PD subsystem 111 operates the flyback-converter 102 to generate and couple to the first and second buck-circuits a $V_{IN}$ equal to a greater of $V_{OUT\_C1}$, $V_{OUT\_C2}$ or a voltage determined from a power drawn on both ports in Watts (Wattage_C1, Wattage_C2) relative to a maximum current (Imax) supported by the multiport USB adaptor 100. The buck-circuit 104a or 104b, associated with the USB port 112a or 112b requesting the lower output voltage ($V_{OUT\_C1}$, or $V_{OUT\_C2}$) is then operated to generate the requested, lower output voltage.

Generally, the requested output voltages ($V_{OUT\_C1}$, or $V_{OUT\_C2}$) can include 5V, 9V, 12V, 15V or 20V. The offset voltage ($V_{OS}$), where applicable, compensates for an expected voltage drop across the buck-circuits 104a or 104b, and is generally dependent on a maximum duty cycle of the buck-converter, that is the buck-controller 110 and buck-circuits 104a or 104b, and is shown here, for example, as equal to 1V. Thus, $V_{IN}$ in variable-buck-input-mode can include 6V, 10V, 13V, 16V or 21V.

Figure 1B:
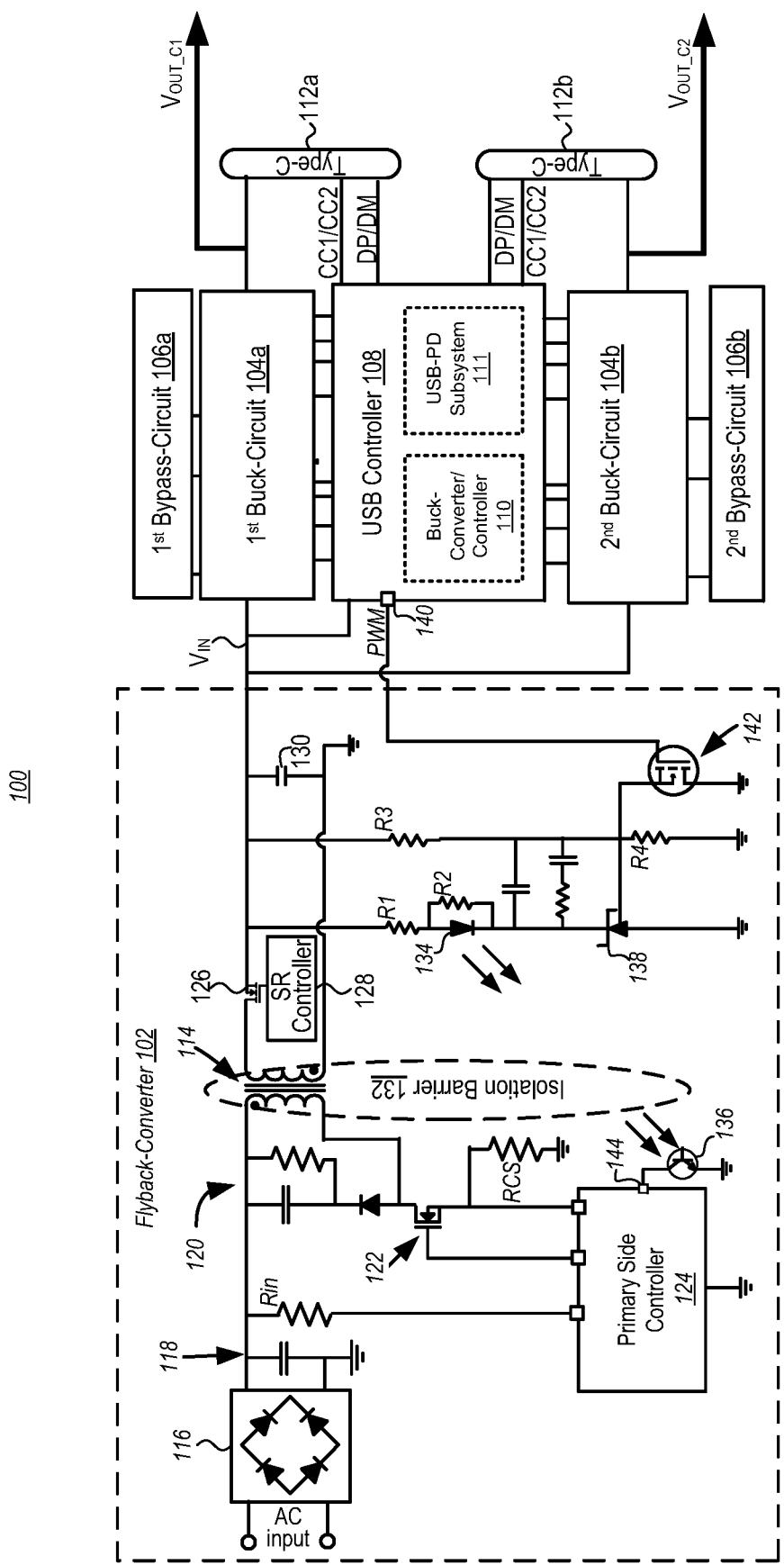
FIG. 1B is a schematic and block diagram of the USB power adaptor of FIG. 1A illustrating an embodiment of the flyback-converter.

An embodiment of the multiport USB power adaptor 100 will now be described in greater detail with reference to FIG. 1B. FIG. 1B is a schematic diagram illustrating an embodiment of the USB power adaptor of FIG. 1A. In the embodiment shown the multiport USB power adaptor 100 is a dual-port USB power adaptor including first and second USB Type-C ports 112a, 112b, and an AC-DC flyback-converter 102.

Referring to FIG. 1B, the AC-DC flyback-converter 102, generally includes a transformer 114 having a primary winding electrically connected or coupled to an input, and a secondary winding coupled to an output.

On the primary side a rectifying circuit, such as a bridge rectifier 116, and one or more input filters 118, 120, coupled to a first terminal of the transformer 114 rectify an AC input voltage and supply input power to the primary winding of the transformer. The flyback-converter 102 further includes a power switch (PS 122), such as a primary field effect transistor (PR_FET), having a drain node coupled to a second terminal of the transformer 114, a gate node coupled to a primary side controller 124, and a source node coupled to the primary side controller and, through a current sensing element, such as a resistive element (RCS), to ground to sense a primary side current (I_primary) flowing through the primary winding when the PS 122 is closed or conducting. Generally, as in the embodiment shown, the primary side controller 124 is further coupled to the first terminal of the transformer 114 through a resistive element (Rin) to receive a voltage or signal equal or proportional to the rectified AC input voltage.

On the secondary side the flyback-converter 102 includes a synchronous rectifier (SR), such as a SR field effect transistor (SR_FET 126), a SR controller 128 coupled to a drain node and gate of the SR_FET and an output capacitor 130.

The flyback-converter 102 further includes an isolation circuit or barrier 132 to electrically isolate the secondary side from the AC input voltage present on the primary side. Because the transformer 114 is a step down transformer it is generally considered part of the isolation barrier 132. The isolation barrier 132 further includes an opto-isolator to provide electrical isolation on a flyback or feedback path from the USB-PD subsystem 111 of the USB controller 108 and the primary side controller 124. Generally, the opto-isolator includes a light emitting element, such as a light emitting diode (LED) 134, and a light sensitive element, such as a phototransistor 136. The LED 134 has an anode coupled to the drain of the SR_FET 126 through a first voltage divider including a first resistive element (R1) and a second resistive element (R2), and a cathode coupled to ground through a shunt regulator 138. The cathode of the LED 134 and the shunt regulator 138 are further coupled to a feedback (FB) pin 140 of the of the USB controller 108 through a second voltage divider including resistive elements R3 and R4, and through an enhancement mode n-channel MOSFET 142 to receive a pulse width modulated (PWM) feedback signal, which enables secondary side control of the flyback-converter 102. The phototransistor 136 can include a bipolar NPN transistor, and is coupled to the primary side controller 124 through an FB_input pin 144. Alternatively, the shunt regulator 138, MOSFET 142, and resistors R3 and R4 may integrated in USB-PD subsystem 111 of the USB controller 108, and, for some highly integrated flyback controller designs, the USB controller 108 can control flyback-converter 102 through a digital interface such as an Inter-Integrated Circuit (I2C), or Serial Peripheral Interface (SPI).

In operation the SR controller 128 senses voltage on the SR_DRAIN and turns the SR_FET on and off in response to sensed voltage peaks, and negative and zero-crossings. The primary side controller 124 receives a signal from the SR_FET 126 or SR controller 128 over a feedback or flyback path. During the time in which the PS 124 is on or closed with SR_FET 126 being off or open, the flyback-converter 102 is said to be operating in fly-back mode, and a magnetic field builds up in the transformer 114 while a current on the primary side increases linearly. When the PS 124 is off or opened, and SR_FET 126 is on or closed, the flyback-converter 102 transfers the power to secondary side, in which the magnetic field begins to collapse and the secondary side current decreases steadily, but gradually as power is given to the Cout 130 connected to the output until a point is reached at which there is zero current flow in the secondary.

Figure 1C:
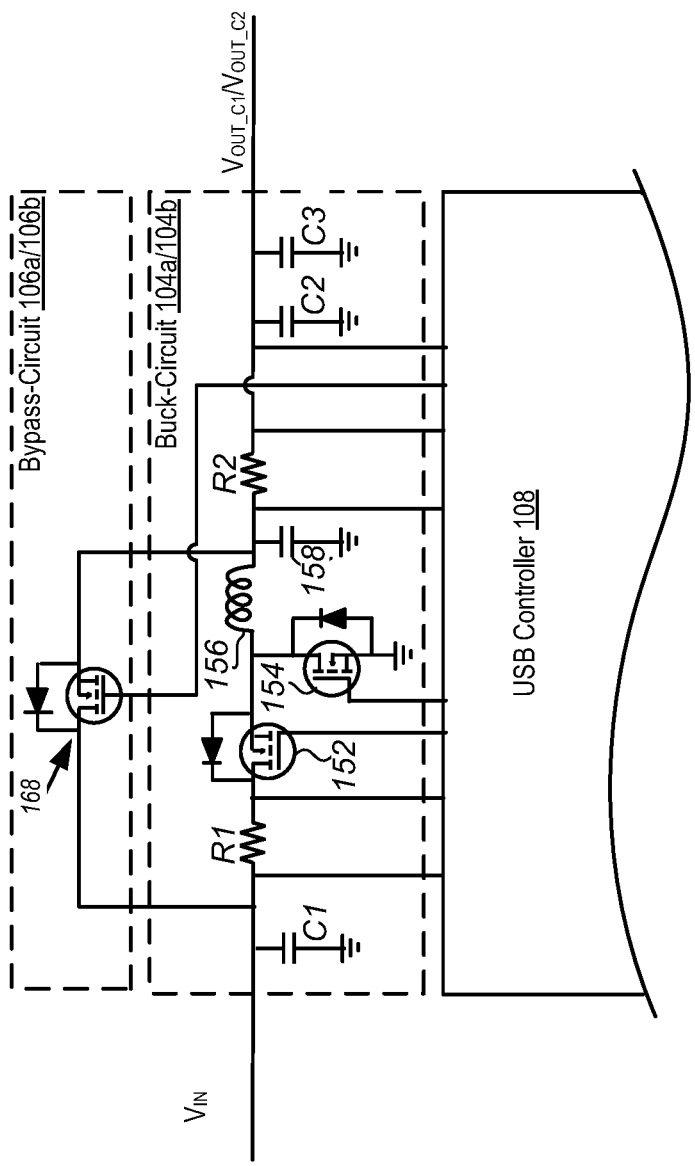
FIG. 1C is a schematic and block diagram of the USB power adaptor of FIGS. 1A and 1B illustrating an embodiment illustrating an embodiment of a buck-circuit and bypass-circuit.

FIG. 1C is a schematic diagram illustrating an embodiment of an external buck-circuit 104a/104b and bypass-circuit 106a/106b suitable for use with the USB power adaptor of FIGS. 1A and 1B. Referring again to FIG. 1C, each external buck-circuit 104a/104b generally includes a first or input capacitor (C1) and a first or input resistor (R1), a first switching element 152, a second switching element 154, an inductor 156, a capacitor 158 and a second or output capacitor (C2) and a second or output resistor (R2). The buck-circuit 104a/104b is capable of providing an output voltage from 0V to just below $V_{IN}$. This is accomplished by operating the buck-controller 110 to switch the buck-circuit 104a/104b between a mode that stores energy in the inductor 156 while the capacitor 158 supplies the output and one that releases that stored energy in order to recharge the capacitor. When switching element 152 is on and switching element 154 is off, energy is stored in the inductor. When switching element 152 is off and switching element 154 is on, energy is sent to capacitor 158 to output voltage.

Referring again to FIG. 1C, generally each bypass-circuit 106a/106b, includes an enhancement mode n-channel MOSFET 168 connect in parallel across the input and output of the external buck-circuit 104a/104b. A gate terminal controlled by the USB-PD 111 of the USB controller 108 to turn on and bypass the buck-circuit 104a/104b when the USB power adaptor 100 is operated in a buck-bypass-mode, thereby enabling the output voltage ($V_{OUT\_C}$) to equal the input voltage ($V_{IN}$) to the external buck-circuits.

Figure 2:
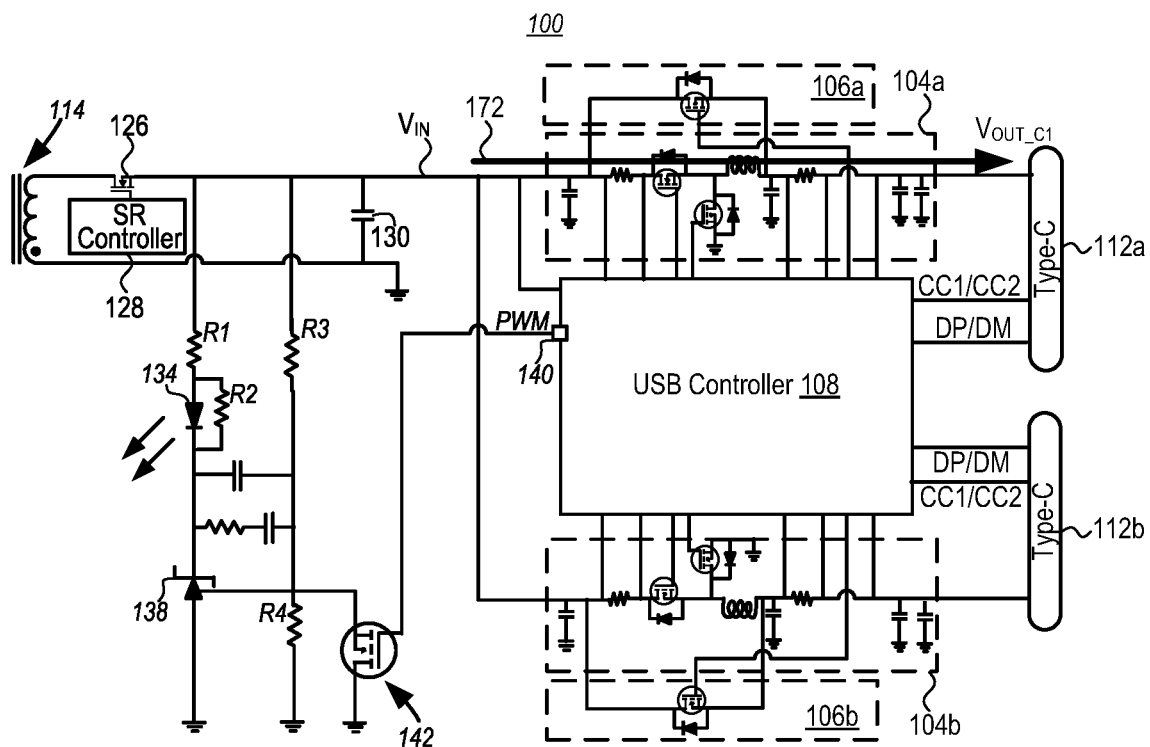
FIG. 2 is a schematic and block diagram illustrating a portion of a USB power adaptor configured for a variable-buck-input-mode of operation.

FIG. 2 is a schematic block diagram of a portion of a USB power adaptor 100 including a secondary side of the flyback-converter 102, buck-circuits 104a, 104b, bypass-circuits 106a, 106b, and a USB controller 108 including a USB-PD subsystem 111 and buck-controller 110, and illustrates the USB power adaptor configured for a variable-buck-input-mode of operation. Referring to FIG. 2, heavy black arrow 172 represents the power path through the first buck-circuit 104a where a single USB port 112a is active. As noted above, where a single USB port 112a is active the USB-PD subsystem 111 of the USB controller 108 controls the flyback-converter 102 to provide a $V_{IN}$ equal to a sum of a requested $V_{OUT\_C1}$ and an offset voltage ($V_{OS}$), and enables and operates the buck-controller 110 and external buck-circuit 104a, 104b to provide the requested $V_{OUT\_C1}$.

If the second USB port 112b was also active, the USB-PD subsystem 111 of the USB controller 108 would operate the flyback-converter 102 to provide a $V_{IN}$ equal to a sum of $V_{OS}$ and the higher of the requested $V_{OUT\_C1}$, a requested $V_{OUT\_C2}$ or a voltage determined from a power drawn on both ports in Watts (Wattage$_{\_C1}$, Wattage$_{\_C2}$) relative to a maximum current (Imax) supported by the USB power adaptor 100. The USB-PD subsystem 111 would then enable and operate the buck-controller 110 and buck-circuits 104a, 104b, to provide the requested $V_{OUT\_C1}$ and $V_{OUT\_C2}$ respectively.

Figure 3:
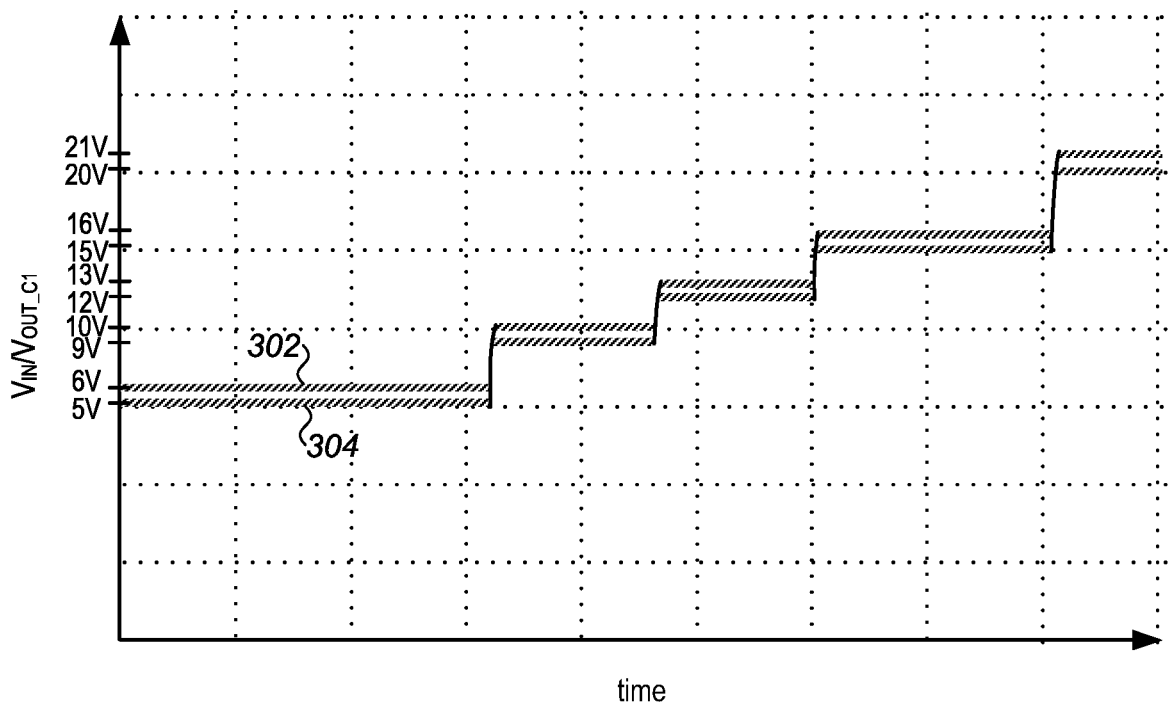
FIG. 3 is a plot of input voltage to and output voltage from a buck-circuit of the USB power adaptor of FIG. 2 operating in a variable-buck-input-mode of operation.

FIG. 3 is a plot of input voltage ($V_{IN}$ 302) to and output voltage ($V_{OUT\_C}$ 304) from a USB adaptor including a buck-controller operating in a variable-buck-input-mode of operation. Referring to FIG. 3 it is shown that $V_{IN}$ 302 tracks the output voltages as $V_{OUT\_C}$ 304 increases from 5 to 20V over time, separated only by the offset voltage $V_{OS}$.

Figure 4:
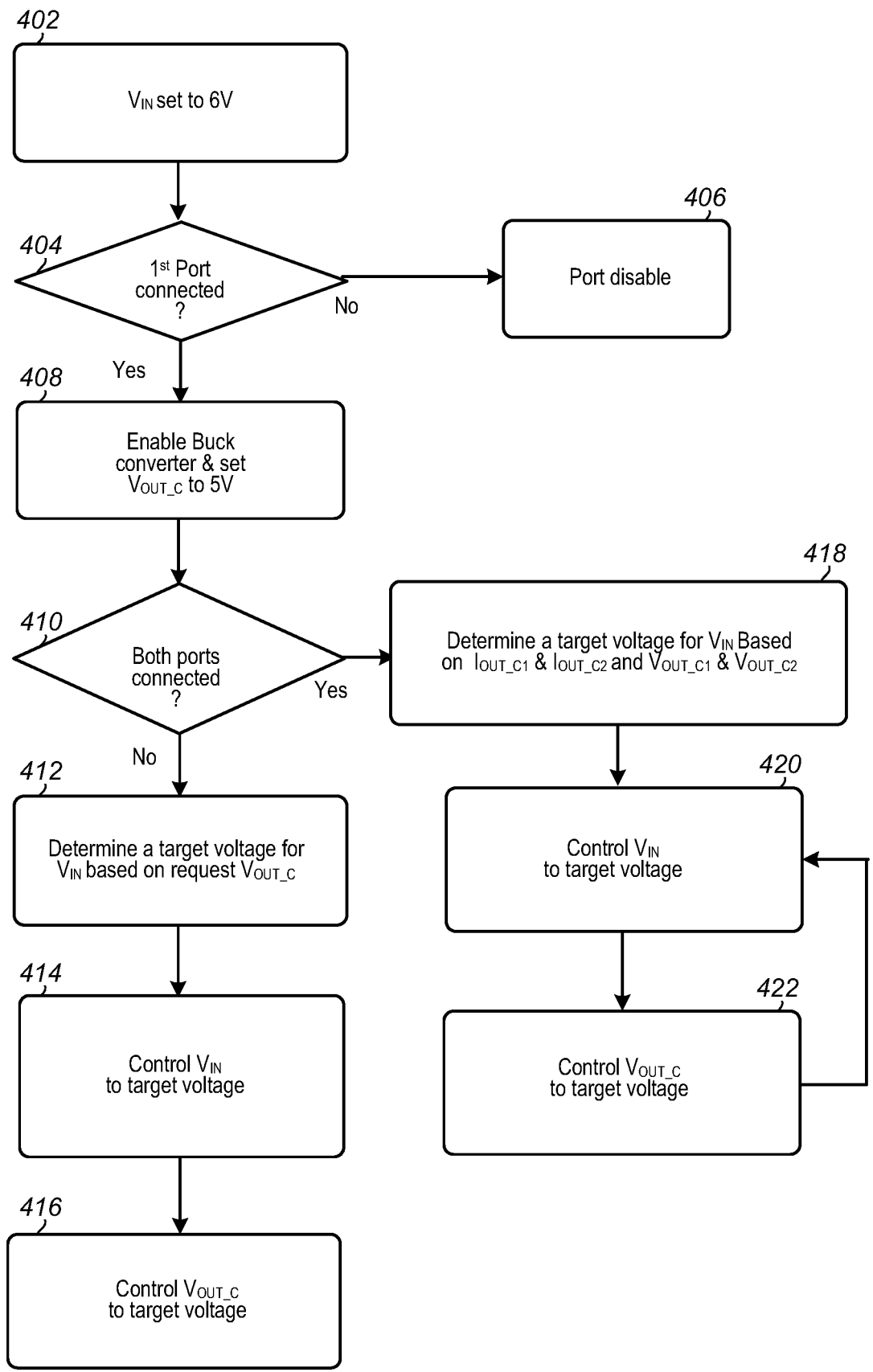
FIG. 4 is a flowchart illustrating a method of operating a USB power adaptor in a variable-buck-input-mode of operation.

A method of operating a multiport USB power adaptor including a flyback-converter, multiple buck-circuits, and a USB controller including a USB-PD subsystem and buck-controller in a variable-buck-input-mode will now be described with reference to FIG. 4. Referring to FIG. 4 the method begins with setting a voltage ($V_{IN}$) into the buck-controller(s) to a voltage higher by a predetermined offset voltage ($V_{OS}$) than a lowest supported output voltage ($V_{OUT\_C}$) that could be required by one or more of the multiple USB ports, shown here as $V_{IN}$=6V (step 402). The $V_{IN}$ is set by operating or controlling the flyback-converter using the USB-PD controller. Generally, supported output voltages that could be required by one or more of the multiple USB ports include 5V, 9V, 12V, 15V or 20V. The offset voltage ($V_{OS}$) compensates for a voltage drop across the buck-circuits, and is generally dependent on a maximum duty cycle of the buck-converter, that is the buck-controller and buck-circuits, and is shown here, for example, as equal to 1V. Thus, $V_{IN}$ can include 6V, 10V, 13V, 16V or 21V.

Next, a determination is made as to whether at least a first port of the multiple USB ports is active—that is whether a device is connected to the first port (step 404). This can be accomplished by a USB-PD controller receiving a signal, such as one indicating the output voltage ($V_{OUT\_C}$) required from the USB port over a communication channel (CC) or D+/D− lines to the port. If no device is detected, the USB port is disabled (step 406). If a device is connected, i.e., the first port is active, the buck-controller(s) associated with the first port is enabled and operated to supply a requested $V_{OUT\_C}$ to the USB port, shown here as $V_{OUT\_C}$=5V (step 408).

A determination is the made as to whether another of the multiple USB ports is active, and has a device connected thereto (step 410). If no second or additional USB port is active, the USB-PD controller decides on a $V_{IN}$, selected to maximize efficiency of the multiport USB adaptor based on the requested $V_{OUT\_C}$ (step 412). The flyback-converter is operated to set a $V_{IN}$ into the buck-controller associated with the single active port to a voltage equal to a sum of the predetermined offset voltage ($V_{OS}$) and the requested or targeted $V_{OUT\_C}$ (step 414). Here as an example, for a $V_{OS}$ of 1V, the target $V_{IN}$ can include 6V, 10V, 13V, 16V or 21V. Finally, the buck-controller is operated to control $V_{OUT\_C}$ to the requested or target voltage (step 416).

If a second active port having a device connected thereto is detected in step 410, the USB-PD controller decides on a $V_{IN}$ based on $V_{OS}$, a maximum or greater of $V_{OUT\_C1}$ requested on the first active port or a $V_{OUT\_C2}$ requested on the second active port, or a voltage determined from a power drawn on both ports in Watts (Wattage$_{\_C1}$, Wattage$_{\_C2}$) relative to a maximum current ($I_{max}$) supported by the multiport USB adaptor. Thus, $V_{IN}$ is determined based on $I_{OUT\_C1}$ and $I_{OUT\_C2}$, and $V_{OUT\_C1}$ and $V_{OUT\_C2}$ (step 418).

The flyback-converter is operated to set a $V_{IN}$ to the voltage determined by the USB-PD controller (step 420), and the buck-controllers are operated individually to independently control $V_{OUT\_C1}$, and $V_{OUT\_C2}$ to the requested or target voltages (step 422). It will be understood that $V_{OUT\_C1}$ and $V_{OUT\_C2}$ can but need not be equal to one another. Generally, the method further includes a feedback loop or mechanism in which the currents ($I_{OUT\_C1}$, $I_{OUT\_C2}$) drawn on both ports through the buck-controllers is continually monitored and the flyback-converter is operated to adjust $V_{IN}$ in response thereto.

Figure 5B:
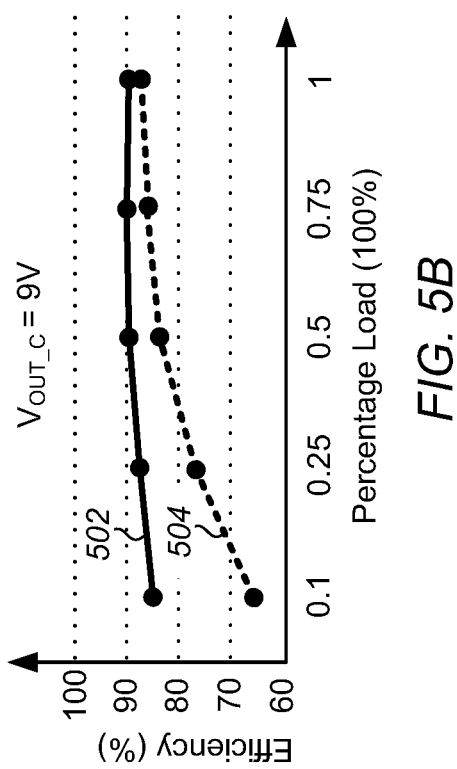
FIGS. 5A-D are graphs illustrating efficiency of a USB power adaptor operated in a variable-buck-input-mode as compared to a conventional USB power adaptor operated using fixed buck input voltage.
Figure 5D:
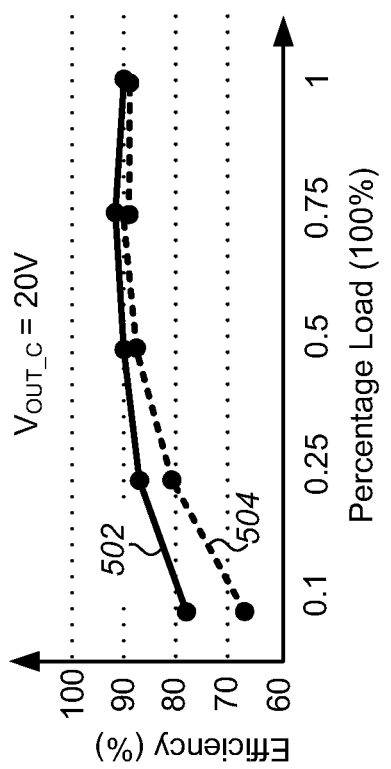
Figure 5A:
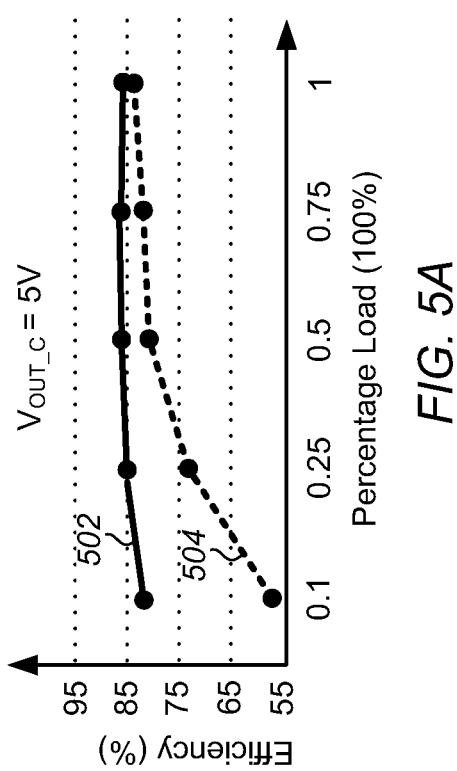
Figure 5C:
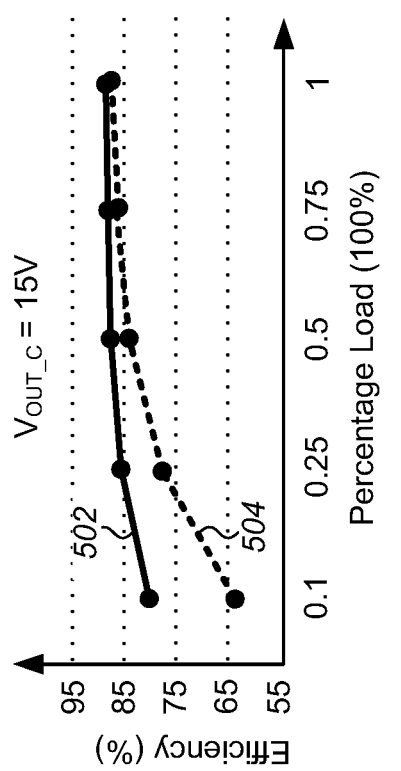

FIGS. 5A-D are graphs illustrating efficiency of a USB power adaptor operated in a variable-buck-input-mode of operation as compared to a conventionally operated buck-controller having a fixed input voltage of 22V. In these graphs the efficiency of the USB power adaptor operated in a variable-buck-input-mode are represented by solid lines 502 while the efficiency of the conventionally operated USB power adaptor are represented by dashed lines 504. It is further noted that the efficiency is expressed as a percentage, and that it increases as a function of a percentage of load on the adaptor. Referring to FIG. 5A it is seen for a USB power adaptor operated in a variable-buck-input-mode at a requested output voltage ($V_{OUT\_C}$) of 5V has a greater efficiency at all percentages of load, and in particular at lower loads shows an increase in efficiency of about 30% over the conventionally operated buck-controller having a fixed input voltage of 22V. FIG. 5B illustrates similar improvements in efficiency for a USB power adaptor operated in a variable-buck-input-mode at a $V_{OUT\_C}$ of 9V, and FIGS. 5C and 5D illustrate the improvement in efficiency at a $V_{OUT\_C}$ of 15V and 20V, respectively.

Figure 6:
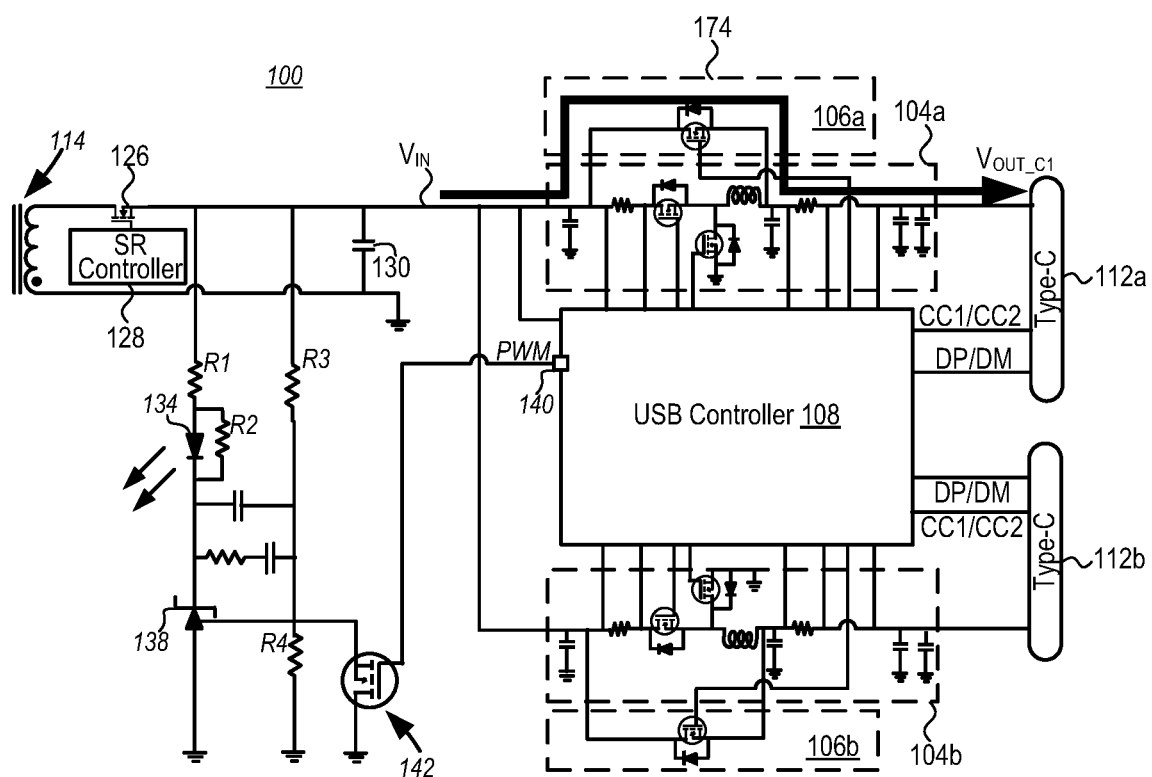
FIG. 6 is a schematic and block diagram illustrating a portion of a USB power adaptor configured for a buck-bypass-mode of operation.

FIG. 6 is a schematic block diagram of a portion of a USB power adaptor 100 including a secondary side of the flyback-converter 102, buck-circuits 104a, 104b, bypass-circuits 106a, 106b, and a USB controller including a USB-PD subsystem 111 and buck-controller 110, and illustrates the USB power adaptor configured for a buck-bypass-mode of operation. Referring to FIG. 6, heavy black arrow 174 represents the power path through the first bypass-circuit 106a where a single USB port 112a is active. As noted above, where a single USB port 112a is active the USB-PD subsystem 111 controls the flyback-converter 102 to provide a $V_{IN}$ equal to a requested $V_{OUT\_C1}$ and enables the first bypass-circuit 106a to provide the requested $V_{OUT\_C1}$.

If the second USB port 112b is also active the USB-PD subsystem 111 of the USB controller 108 will operate the flyback-converter 102 to provide a $V_{IN}$ equal to the higher of the requested $V_{OUT\_C1}$, a requested $V_{OUT\_C2}$ or a voltage determined from a power drawn on both ports in Watts (Wattage$_{\_C1}$, Wattage$_{\_C2}$) relative to a maximum current ($I_{max}$) supported by the USB power adaptor 100. The USB-PD subsystem 111 would then enable the bypass-circuit 106a or 106b associated with one of the USB ports 112a or 112b requesting the higher $V_{OUT\_C}$ to provide a $V_{OUT\_C}$ equal to $V_{IN}$, and to enable and operate the buck-controller 110 and buck-circuit 104a or 104b associated with the other USB port to provide the requested, lower $V_{OUT\_C}$. Thus, when both ports are active at low wattages the USB power adaptor 100 can continue to operate in buck-bypass-mode. However, when the power drawn on both ports will cause the current to exceed the $I_{max}$ supported by the USB power adaptor 100 the USB-controller will need to switch the operation from buck-bypass-mode to variable-buck-input-mode.

Alternatively, if the requested $V_{OUT\_C1}$ and requested $V_{OUT\_C2}$ are the same the USB-PD subsystem 111 of the USB controller 108 would control the flyback-converter 102 to provide a $V_{IN}$ equal to the requested $V_{OUT\_C1}$ and $V_{OUT\_C2}$, and then enable both bypass-circuits 106a and 106b.

Figure 7:
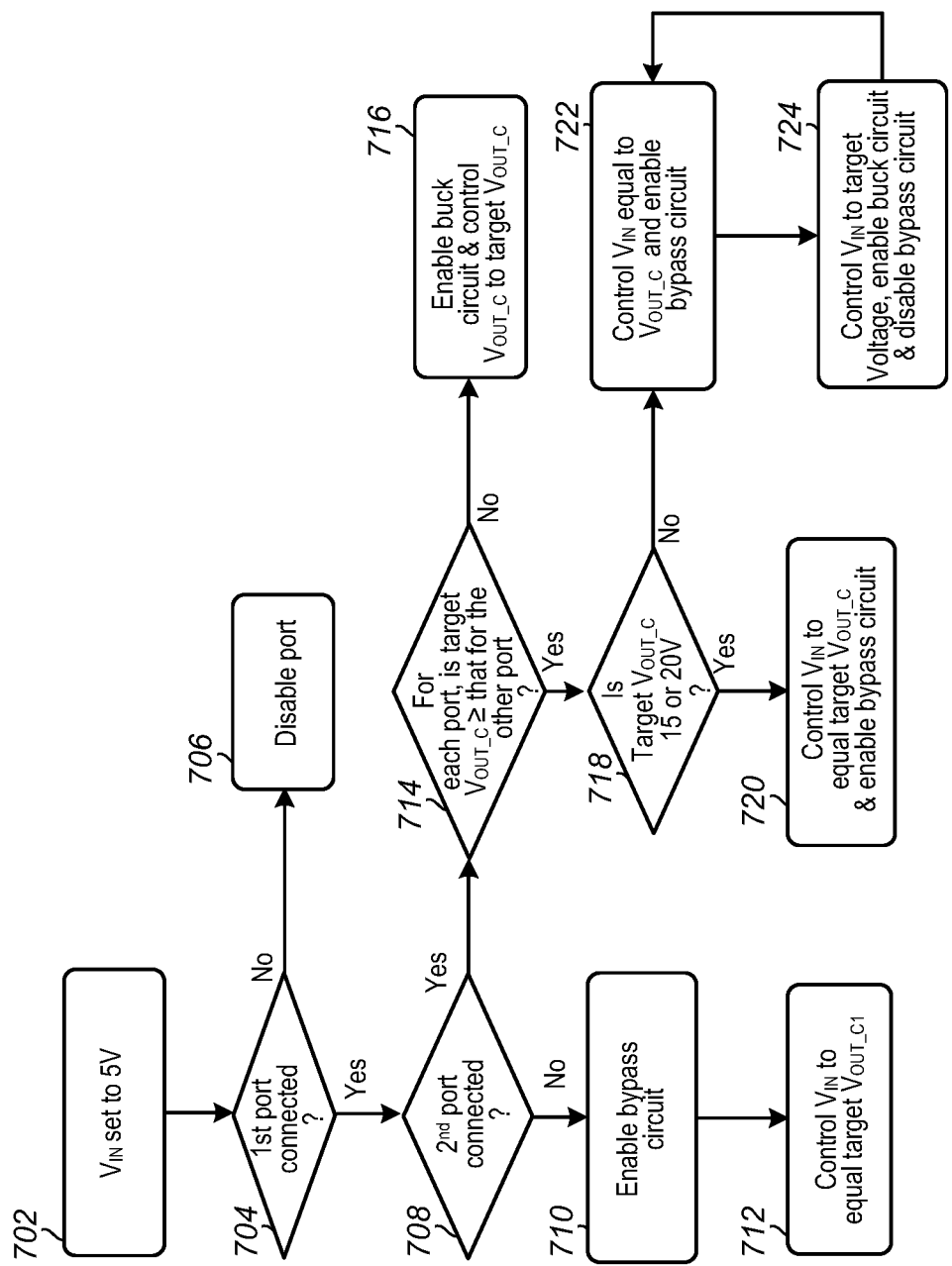
FIG. 7 is a flowchart illustrating a method of operating a USB power adaptor in a buck-bypass-mode of operation.
Figure 8A:
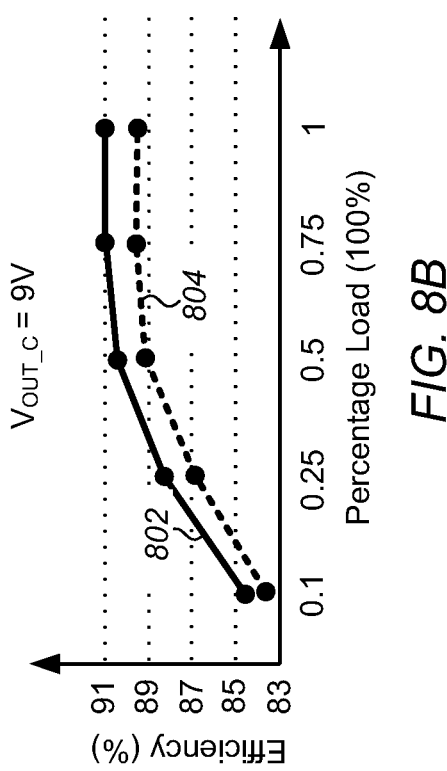
FIGS. 8A-D are graphs illustrating efficiency of a USB power adaptor operated in a buck-bypass-mode as compared to a variable-buck-input-mode of operation.
Figure 8B:
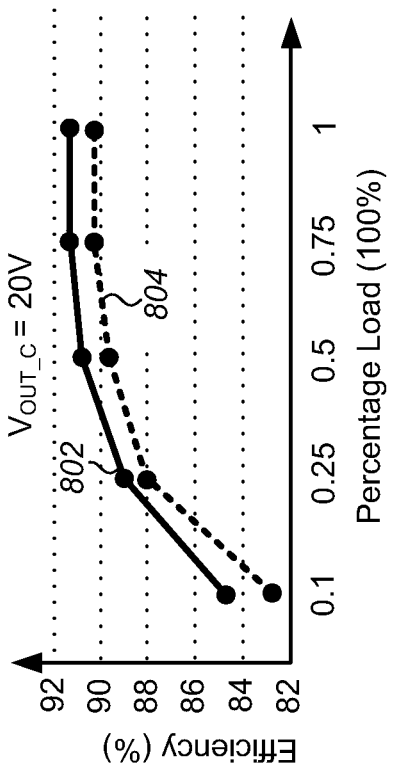
Figure 8C:
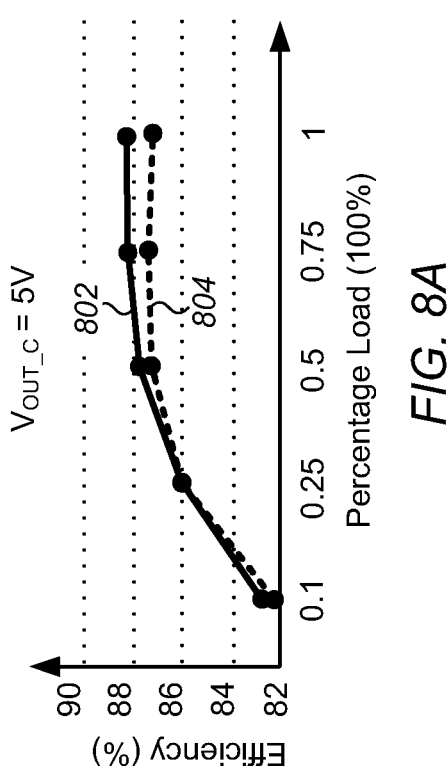
Figure 8D:
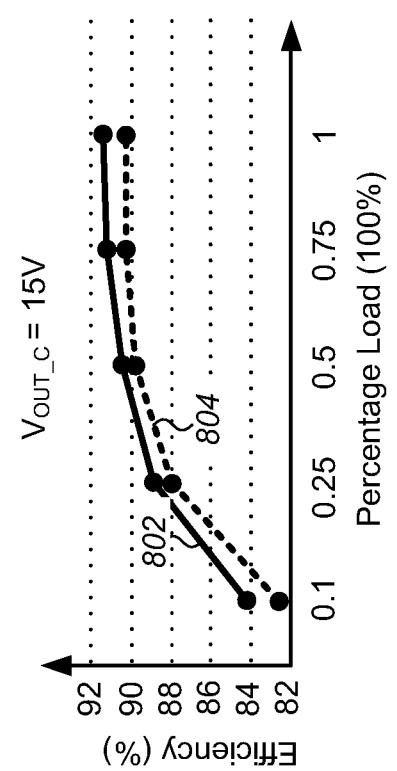

A method of operating a multiport USB adaptor including a USB-PD controller, a flyback-converter, one or more buck-controllers, and one or more bypass-circuits in a buck-bypass-mode will now be described with reference to FIG. 7. Referring to FIG. 7 the method begins with operating the flyback-converter to set a voltage ($V_{IN}$) into the buck-controller(s) to a lowest supported output voltage ($V_{OUT\_C}$) from one of the multiple USB ports, shown here as $V_{IN}$=5V (step 702). Generally, as in the variable-buck-input-mode described above supported output voltages can include 5V, 9V, 12V, 15V or 20V.

Next, a determination is made as to whether at least a first port of the multiple USB ports is active—that is whether a device is connected to the first port (step 704). If no device is detected, the first port is disabled (step 706). If a device is connected, i.e., the first port is active, a determination is the made as to whether a second port of the multiple USB ports is active, and has a device connected thereto (step 708). If the second port is not active, the USB-PD subsystem enables the associated, first bypass circuit (step 710), and controls $V_{IN}$ to equal the target voltage ($V_{OUT\_C}$) for the first port (step 712).

If a second device is detected connected to a second port in step 708, the following steps are performed for each port. First, a determination is made for each port as to whether the requested or target output voltage ($V_{OUT\_C}$) for that port is greater than or equal that for the other port (714). That is for the first port is $V_{OUT\_C1} \geq V_{OUT\_C2}$, and for the second port is $V_{OUT\_C2} \geq V_{OUT\_C1}$. If the target $V_{OUT\_C}$ of the port for which the determination is being made is not greater than or equal to that of the other port, i.e., it is less than that of the other port, the USB-PD subsystem enables and operates the buck-circuit associated with the port to provide the target $V_{OUT\_C}$ to port (step 716). It will be understood that the bypass-circuit associated with the port will also be disabled. If the target $V_{OUT\_C}$ for the first port (for example) is greater than or equal to that of the other or second port, a determination is made as whether the first port has a target $V_{OUT\_C}$ of either 15V or 20V (step 718). If the target $V_{OUT\_C}$ for the port is equal to either 15V or 20V and, the USB-PD subsystem controls the flyback-converter to generate a $V_{IN}$ equal to the target voltage $V_{OUT\_C}$, i.e., either 15V or 20V, and enables the bypass circuit associated with the port (step 720). If the requested or target $V_{OUT\_C}$ is not equal to either 15V or 20V, the USB-PD subsystem controls the flyback-converter to generate a $V_{IN}$ equal to the target voltage $V_{OUT\_C}$ and not equal to 15V or 20V, and enables the bypass circuit associated with the port (step 722). Generally, under these circumstances the $V_{OUT\_C}$ will be less than 15V, and can include, for example, one or more of 5V, 9V or 12V. Preferably, as in the embodiment shown, the method further includes a feedback loop or mechanism (step 724) in which the output voltages ($V_{OUT\_C1}$, $V_{OUT\_C2}$) and current ($I_{out\_C1}$, $I_{out\_C2}$) drawn on both relative to a maximum current (Imax) supported by the USB power adaptor are continually monitored, and the USB power adaptor is controlled to switch operation between buck-bypass-mode and variable-buck-input-mode depending on the total wattage drawn on both ports. When the current drawn on both ports ($I_{out\_C1}$, $I_{out\_C2}$) are small relative to Imax the USB power adaptor can continue to operate in a buck-bypass-mode. When as the current drawn on both ports becomes higher, it will become necessary to increase $V_{IN}$ to a higher voltage (limited by Imax), disable the bypass-circuit and operate the USB power adaptor in variable-buck-input-mode. Note this is only applicable where the greatest target output voltage ($V_{OUT\_C}$) is less than 15V. Where the target output voltage ($V_{OUT\_C}$) is either 15V (optional) or 20V the USB power adaptor in can continue to operate in buck-bypass-mode for the port(s) requesting a either 15V (optional) or 20V.

FIGS. 8A-D are graphs illustrating further gains in efficiency of a USB power adaptor operated in a buck-bypass-mode of operation as compared to a operated buck-controller operated in a variable-buck-input-mode. In these graphs the efficiency of the USB power adaptor operated in a buck-bypass-mode are represented by solid lines 802 while the efficiency of the USB power adaptor operated in variable-buck-input-mode are represented by dashed lines 804. Referring to FIGS. 8A-8D it is seen for a USB power adaptor operated in buck-bypass-mode offers 0.5% to 1.5% efficiency gain across all $V_{OUT\_C}$ voltage from 5V to 20V, and all load conditions.

Figure 9:
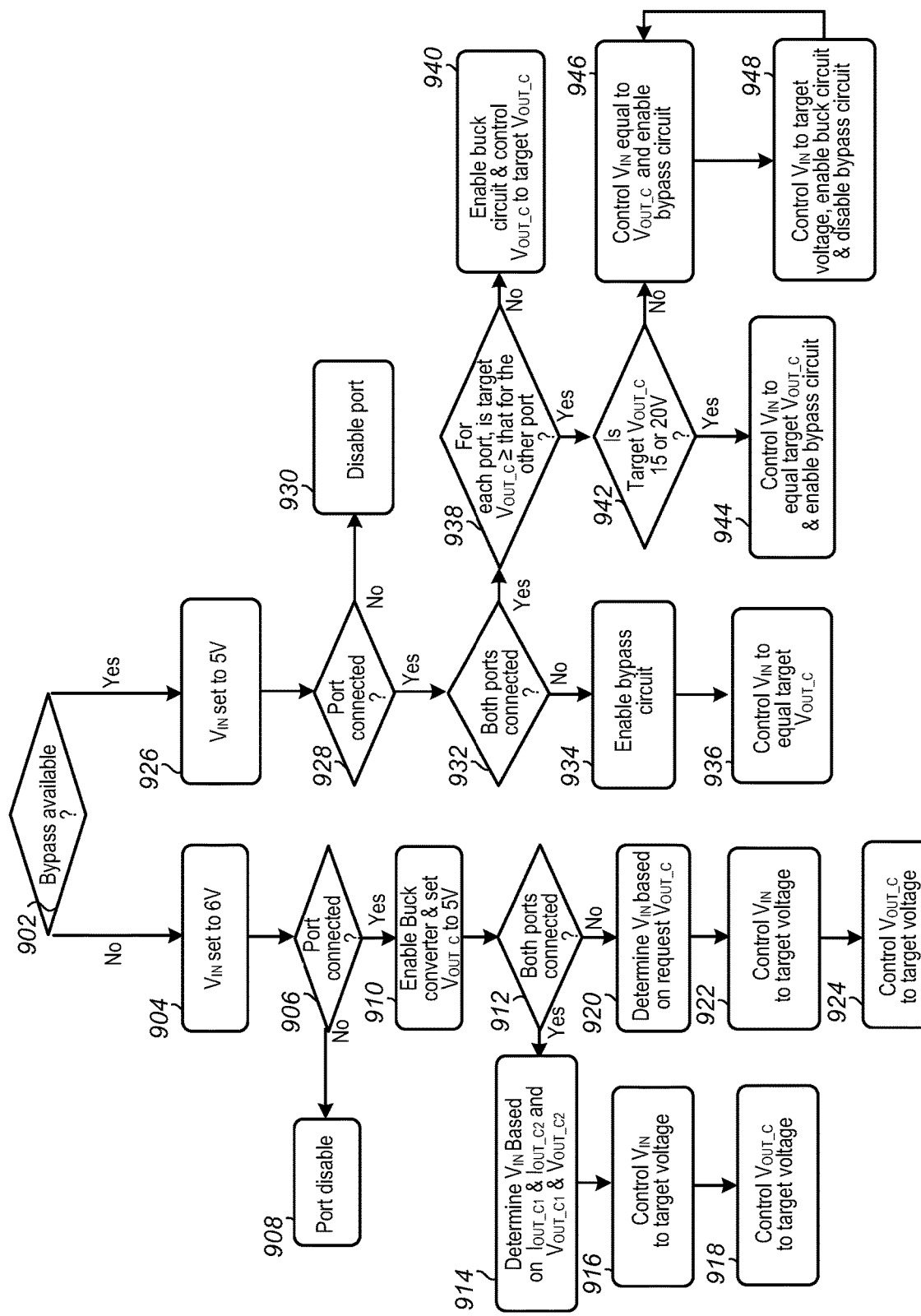
FIG. 9 is a flowchart illustrating a method of operating a USB power adaptor in either a variable-buck-input-mode or a buck-bypass-mode of operation.
Figure 10A:
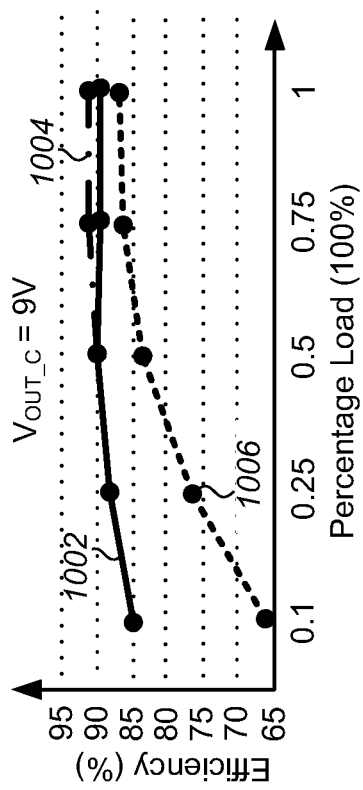
FIGS. 10A-D are graphs illustrating efficiency of a USB power adaptor operated in a buck-bypass-mode as compared to a variable-buck-input-mode of operation and to a conventional USB power adaptor operated using fixed buck input voltage.
Figure 10B:
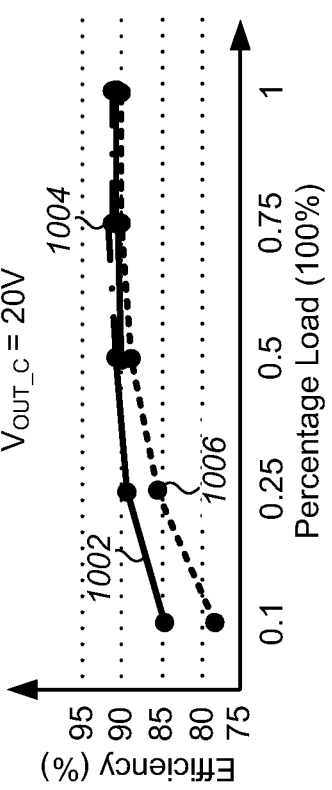
Figure 10C:
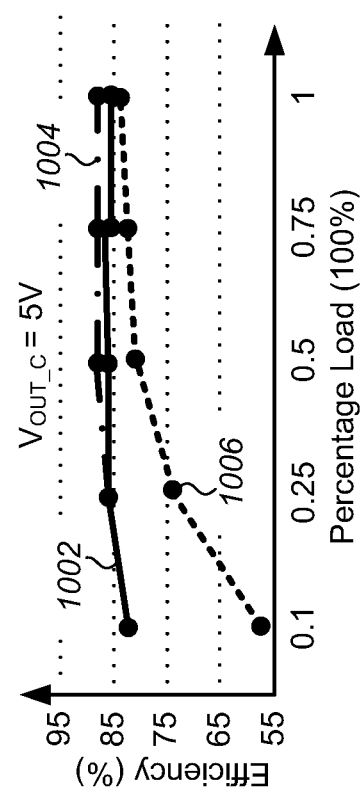
Figure 10D:
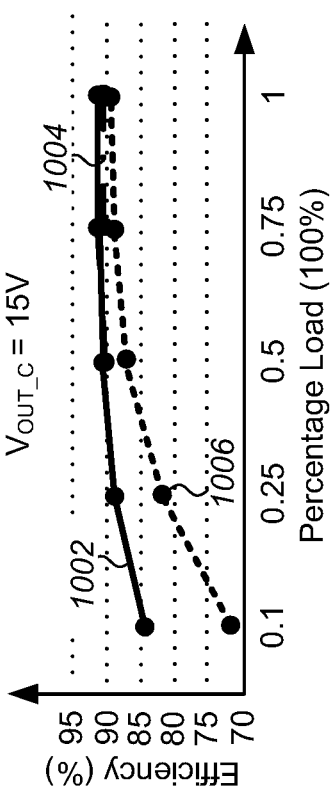

FIG. 9 is a flowchart illustrating a method of operating a multiport USB adaptor in either a variable-buck-input or a buck-bypass-mode of operation. Referring to FIG. 9 the method begins with determining whether one or more bypass-circuits capable of bypassing a buck-controller is available (step 902).

If no bypass-circuit is available, the multiport USB adaptor will be operated in a variable-buck-input mode similar to that described previously with reference to FIG. 4. More particularly the method continues with setting the $V_{IN}$ into the buck-controller(s) to the lowest supported $V_{OUT\_C}$ offset by $V_{OS}$, shown here as $V_{IN}$=6V (step 904). Next, a determination is made as to whether a device is connected to the first port (step 906). If no device is detected, the first port is disabled (step 908). If a device is connected, i.e., the first port is active, the buck-controller(s) associated with the first port is enabled and operated to supply a requested $V_{OUT\_C}$, shown here as $V_{OUT\_C}$=5V (step 910). A determination is then made as to whether second has a device connected thereto (step 912). If not, the USB-PD controller decides on a $V_{IN}$ determined from a power drawn on both ports in Watts (Wattage$_{-C1}$, Wattage$_{-C2}$) relative to a maximum current ($I_{max}$) supported by the multiport USB adaptor. Thus, $V_{IN}$ is determined based on $I_{OUT\_C1}$ and $I_{OUT\_C2}$, and $V_{OUT\_C1}$ and $V_{OUT\_C2}$ (step 914). The flyback-converter is operated to control $V_{IN}$ into the buck-controller to equal to a sum of $V_{OS}$ and the targeted or requested $V_{OUT\_C}$ (step 916). Finally, the buck-controller is operated to control $V_{OUT\_C}$ to the target or requested $V_{OUT\_C}$ (step 918). If a second active port is detected in step 912, the USB-PD controller decides on a target $V_{IN}$ based on $V_{OS}$, a greater of $V_{OUT\_C1}$, a $V_{OUT\_C2}$, or a voltage determined from a power drawn on both ports in Watts (Wattage$_{-C1}$, Wattage$_{-C2}$) relative to a maximum current ($I_{max}$) supported by the multiport USB adaptor (step 920). The flyback-converter is operated to set $V_{IN}$ to the target $V_{IN}$ determined by the USB-PD controller (step 922), and the buck-controllers are operated individually to independently control $V_{OUT\_C1}$, and $V_{OUT\_C2}$ to the requested or target voltages (step 924).

If a bypass-circuit is available, the multiport USB adaptor will be operated in a buck-bypass-mode similar to that described previously with reference to FIG. 8. More particularly the method continues with operating the flyback-converter to set $V_{IN}$ to a lowest supported $V_{OUT\_C}$, shown here as $V_{IN}$=5V (step 926). Next, a determination is made as to whether the first port is active—that is whether a device is connected to the first port (step 928). If no device is detected, the port is disabled (step 930). If a device is connected, i.e., the first port is active, a determination is made as to whether a second port of the multiple USB ports is active, and both ports have a device connected (step 932). If the second port does not have a device connected, the USB-PD subsystem enables the associated, first bypass circuit (step 934), and controls $V_{IN}$ to equal the target voltage ($V_{OUT\_C}$) for the first port (step 936).

If a second device is detected as being connected to the second port in step 932, the following steps are performed for each port. First, a determination is made for each port as to whether the requested or target output voltage ($V_{OUT\_C}$) for that port is greater than or equal that for the other port (938). That is for a first port is $V_{OUT\_C1} \geq V_{OUT\_C2}$, and for a second port is $V_{OUT\_C2} \geq V_{OUT\_C1}$. If the target $V_{OUT\_C}$ of the port for which the determination is being made is not greater than or equal to that of the other port, i.e., it is less than that of the other port, the USB-PD subsystem enables and operates the buck-circuit associated with the port to provide the target $V_{OUT\_C}$ to port (step 940). It will be understood that the bypass-circuit associated with the port will also be disabled. If the target $V_{OUT\_C}$ for the first port (for example) is greater than or equal to that of the other or second port, a determination is made as whether the first port has a target $V_{OUT\_C}$ of either 15V or 20V (step 942). If the target $V_{OUT\_C}$ for the port is equal to either 15V or 20V and, the USB-PD subsystem controls the flyback-converter to generate a $V_{IN}$ equal to the target voltage $V_{OUT\_C}$, i.e., either 15V or 20V, and enables the bypass circuit associated with the port (step 944). If the requested or target $V_{OUT\_C}$ is not equal to either 15V or 20V, the USB-PD subsystem controls the flyback-converter to generate a $V_{IN}$ equal to the target voltage $V_{OUT\_C}$ and not equal to 15V or 20V, and enables the bypass circuit associated with the port (step 946). Generally, under these circumstances the $V_{OUT\_C}$ will be less than 15V, and can include, for example, one or more of 5V, 9V or 12V. Preferably, as in the embodiment shown, the method further includes a feedback loop or mechanism (step 948) in which the output voltages ($V_{OUT\_C1}$, $V_{OUT\_C2}$) and current ($I_{out\_C1}$, $I_{out\_C2}$) drawn on both relative to a maximum current (Imax) supported by the USB power adaptor are continually monitored, and the USB power adaptor is controlled to switch operation between buck-bypass-mode and variable-buck-input-mode depending on the total wattage drawn on both ports. When the current drawn on both ports ($I_{out\_C1}$, $I_{out\_C2}$) are small relative to Imax the USB power adaptor can continue to operate in a buck-bypass-mode. When as the current drawn on both ports becomes higher, it will become necessary to increase $V_{IN}$ to a higher voltage (limited by Imax), disable the bypass-circuit and operate the USB power adaptor in variable-buck-input-mode. Note this is only where the greatest target output voltage ($V_{OUT\_C}$) is less than 15V. Where the target output voltage ($V_{OUT\_C}$) is either 15V (optional) or 20V the USB power adaptor in can continue to operate in buck-bypass-mode for the port(s) requesting a either 15V (optional) or 20V.

FIGS. 10A-D are graphs illustrating gains in efficiency of a USB power adaptor including a buck-controller operated in a buck-bypass-mode as compared to a buck-controller operated in a variable-buck-input-mode, and a buck-controller operated with a fixed, 22V buck input voltage. In these graphs the efficiency of the USB power adaptor operated in a buck-bypass-mode are represented by solid lines 1002, while the efficiency of the USB power adaptor operated in variable-buck-input-mode is represented by first dashed lines 1004, and those conventionally operated using a fixed buck input voltage are represented by dashed lines 1006. Referring to FIGS. 10A-D it is seen for a USB power adaptor operated in buck-bypass-mode offers the best efficiency among all three modes of operation, while variable-buck-input-mode offers an efficiency nearly as good, and better efficiency as compared to the conventional fixed buck input voltage mode.

Figure 11:
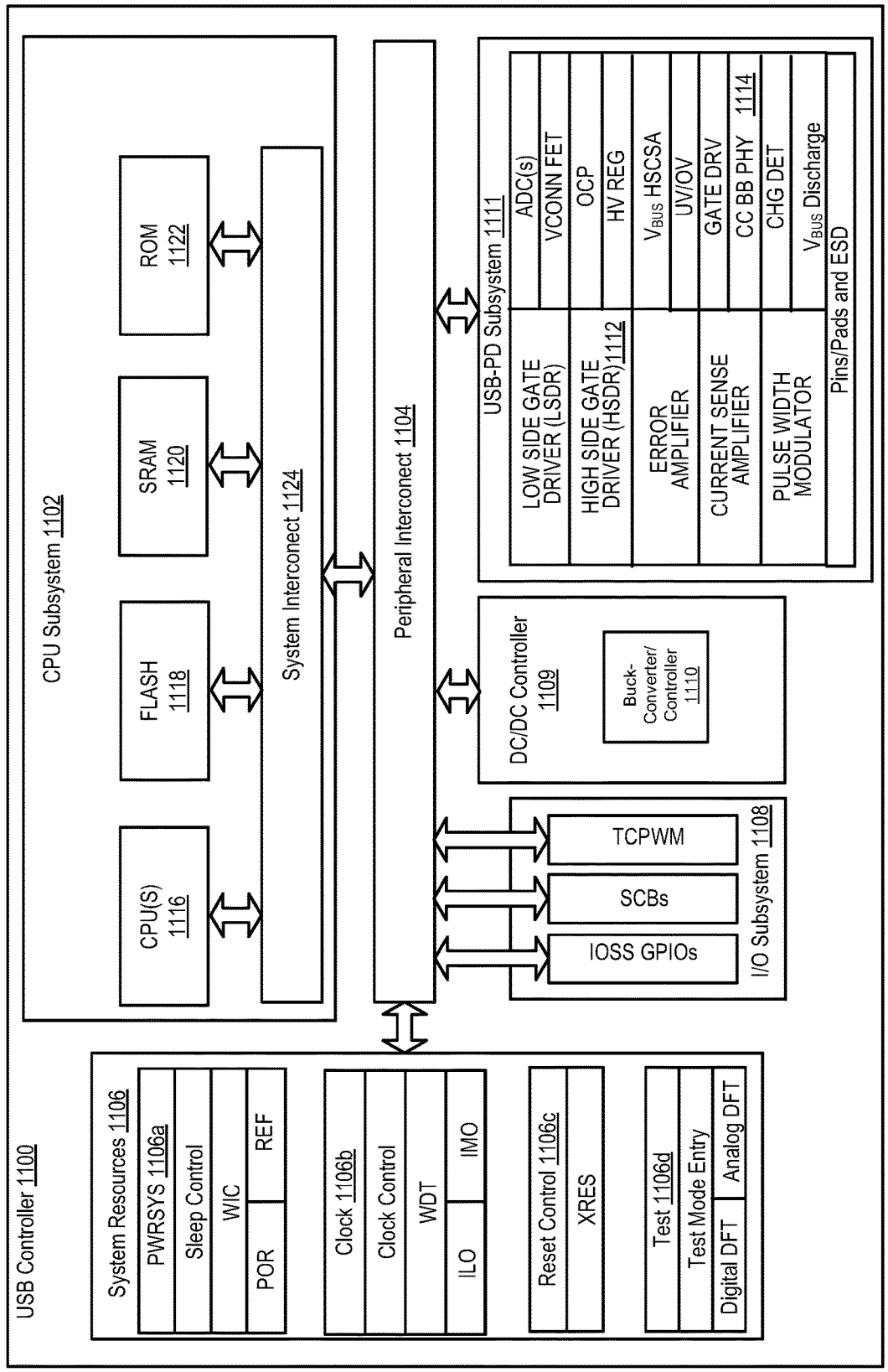
FIG. 11 is an on-chip, integrated circuit (IC) USB controller including a USB-PD subsystem and buck converter suitable for use in the USB power adaptor of FIG. 1A in accordance with exemplary embodiments of the present disclosure.

FIG. 11 is an on-chip, integrated circuit (IC) USB controller including a USB-PD subsystem and buck converter suitable for use in the USB power adaptor of FIG. 1A. Referring to FIG. 11, the USB controller 1100 generally includes a central processing units (CPU) subsystem 1102, peripheral interconnect 1104, system resources 1106, input/output (I/O) subsystem 1108, a DC/DC-controller 1109 including a buck controller 1110 and a USB power delivery (USB-PD) subsystem 1111 including a high-side gate driver (HSDR 1112) for controlling switches of the buck and bypass-circuits, and a communication channel PHY (CC BB PHY 1114) logic for supporting communications on a Type-C Communication Channel (CC), including requested $V_{OUT\_C}$ levels.

The CPU subsystem 1102 includes one or more CPUs 1116, flash memory 1118, Static Random Access Memory (SRAM 1120), and Read Only Memory (ROM 1122) all coupled through a system interconnect 1124. The CPU(s) 1102 can include any suitable processor capable of operating in an integrated circuit (IC) USB controller 1100 or a system on a chip (SoC) device. The flash memory 1118 is a fast, non-volatile memory (e.g., NAND flash, NOR flash, etc.) having shorter access or read times that is configured or operable to store data and programs. The SRAM 1120 is another volatile memory that is configured for storing data and firmware instructions accessed by the CPU(s) 1116. The ROM 1122 can include an embedded non-volatile memory (eNVM) that is configured for storing boot-up routines, configuration parameters, and other firmware parameters and settings. The system interconnect 1124 can include a single-level Advanced High-Performance Bus (AHB) or system bus that is configured as an interface that couples the various components of the CPU subsystem 1102 to each other, as well as a data and control interface between the various components of the CPU subsystem and the peripheral interconnect 1104.

Peripheral interconnect 1104 can include another AHB or peripheral bus that provides the primary data and control interface between CPU subsystem 1102 and other subsystems and resources, such as the system resources 1106, the I/O subsystem 1108, and the USB-PD subsystem 1111.

The system resources 1106 can include various electronic circuits and subsystems to support various states and modes of operation of the USB controller 1100. For example, the system resources 1106 can include a power subsystem (PWRSYS 1106a) including analog and/or digital circuits such as sleep control circuits, a wake-up interrupt controller (WIC), a power-on-reset (POR), voltage and/or current reference generators or circuits (REF). The system resources 1106 can also include a clock subsystem 1106b having analog and/or digital circuits such as, for example, clock control circuits, watchdog timer (WDT) circuit(s), internal low-speed oscillator (ILO) circuit(s), and internal main oscillator (IMO) circuit(s). The system resources 1106 can also include analog and/or digital circuit reset circuits 1106c that provide reset control and support external reset (XRES). In some embodiments, such as that shown, the system resources 1106 can further include a test subsystem 1106d, including various test circuits or blocks for test mode entry and analog and/or digital design-for-testability (DFT) operations.

The I/O subsystem 1108 can include various different types of I/O blocks and subsystems including, for example, general purpose input output blocks subsystems (IOSS GIPOs), timer/counter/pulse-width-modulation (TCPWM) blocks, and serial communication blocks (SCBs).

The USB-PD subsystem 1111 provides an interface to the USB connectors or ports, and is configured to support USB communications as well other USB functionality, such as power delivery and battery charging. Generally, the USB-PD subsystem 1111 includes the electro-static discharge (ESD) protection circuits required on a Type-C port. USB-PD subsystem 1111 also includes a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. USB-PD subsystem 1111 also provides the termination resistors (RP and RD) and their switches, as required by the USB-PD specification, to implement connection detection, plug orientation detection, and power delivery roles over a Type-C cable. IC controller (and/or the USB-PD subsystem 1111 thereof) may also be configured to respond to communications defined in a USB-PD Specification such as, for example, SOP (start-of-packet), SOP', and SOP" messaging.

Among other circuitry, USB-PD subsystem 1111 may further include: one or more analog-to-digital convertors (ADCs) for converting various analog signals to digital signals; a VCONN FET; an error amplifier (ERROR AMP) for controlling the power source voltage applied to the VBUS line per a PD contract; a high voltage regulator (HV REG) for converting the power supply voltage to the precise voltage (e.g., 3-5V) needed to USB controller 1100; a current sense amplifier (CSA) and an over-voltage protection (OVP) circuits for providing over-current (OCP) and over-voltage (OV) protection and under-voltage (UV) protection on the VBUS line with configurable thresholds and response times; a pulse width modulator (PWM); one or more gate drivers (GATE DRV) for controlling the power switches that turn ON and off the provision of power over the VBUS line; a low-side gate driver (LSDR); a charging protocol detection block (CHG DET) to detect and support different types of proprietary charging standards; and at least two on-die discharge (VBUS DISCH) circuits that can discharge a VBUS line voltage to any of range of programmable voltage levels.

Thus, a multiport USB-PD adaptor including a flyback-converter, a USB controller with a USB-PD subsystem and buck-controller, and multiple buck and bypass-circuits, and capable of operating in a buck-bypass-mode and/or a variable-buck-input-mode have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections can set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method comprising:
in a universal serial bus (USB) power delivery (USB-PD) adaptor including a plurality of USB ports, a flyback-converter and at least a first buck-circuit through which a first USB port of the plurality of USB ports is coupled to an output of the flyback-converter, determining if a first bypass-circuit through which the output of the flyback-converter can be coupled directly to the first USB port is present; and
if no first bypass-circuit is present, operating the USB power adaptor in a variable-buck-input-mode,
wherein, if only the first USB port is connected to a first device, the flyback-converter is operated to generate and regulate an input voltage ($V_{IN}$) to the first buck-circuit equal to a sum of a first requested output voltage ($V_{OUT\_C1}$) to the first USB port and an offset voltage ($V_{OS}$), and the first buck-circuit is enabled and operated to output $V_{OUT\_C1}$ to the first USB port.

2. The method of claim 1 wherein the first USB port comprises a USB-C port, and wherein output $V_{OUT\_C1}$ comprises a voltage selected from the group consisting of 5V, 9V, 12V, 15V or 20V, and wherein the offset voltage ($V_{OS}$) comprises a voltage determined by a maximum duty cycle supported by the first buck-circuit.

3. The method of claim 1 wherein if a second USB port coupled to the output of the flyback-converter through a second buck-circuit is connected to a second device, the flyback-converter is operated to generate and couple to the first and second buck-circuits a $V_{IN}$ equal to a sum of the offset voltage and a greater of $V_{OUT\_C1}$ or a second requested output voltage ($V_{OUT\_C2}$) to the second USB port, and wherein the first and second buck-circuits are enabled and operated to output $V_{OUT\_C1}$ to the first USB port and to output $V_{OUT\_C2}$ to the second USB port.

4. The method of claim 3 wherein the first and second USB ports comprise USB-C ports, and wherein $V_{OUT\_C1}$ and $V_{OUT\_C2}$ comprise a voltage selected from the group consisting of 5V, 9V, 12V, 15V or 20V.

5. The method of claim 1 wherein if the first bypass-circuit is present, operating the USB power adaptor in a buck-bypass-mode, such that if only the first USB port is connected to the first device the first bypass-circuit is enabled, and the flyback-converter is operated to generate and regulate a $V_{IN}$ equal to $V_{OUT\_C1}$, which is then coupled to the first USB port through the first bypass-circuit.

6. The method of claim 5 wherein the first USB port comprises a USB-C port, and wherein output $V_{OUT\_C1}$ comprises a voltage selected from the group consisting of 5V, 9V, 12V, 15V or 20V.

7. The method of claim 5 wherein if a second USB port coupled to the output of the flyback-converter through a second buck-circuit is connected to a second device, the flyback-converter is operated to generate and couple to the first and second buck-circuits a $V_{IN}$ equal to a greater of $V_{OUT\_C1}$ or a second requested output voltage ($V_{OUT\_C2}$) to the second USB port.

8. The method of claim 7 wherein the USB power adaptor further comprises a second bypass-circuit.

9. The method of claim 8 further comprising enabling either the first bypass-circuit or second bypass-circuit to couple the greater of $V_{OUT\_C1}$ to the first USB port or $V_{OUT\_C2}$ to the second USB port, and to enable and operate either the first buck-circuit or second buck-circuit to output a lower of $V_{OUT\_C1}$ or $V_{OUT\_C2}$ to the first or second USB ports.

10. The method of claim 9 wherein the first and second USB ports comprise USB-C ports, and wherein $V_{OUT\_C1}$ and $V_{OUT\_C2}$ comprise a voltage selected from the group consisting of 5V, 9V, 12V, 15V or 20V.

11. The method of claim 8 wherein $V_{OUT\_C1}$ is equal to $V_{OUT\_C2}$, and wherein both the first and second bypass-circuits are enabled to directly couple $V_{IN}$ to the first and second USB ports.

12. A universal serial bus power delivery (USB-PD) power adaptor comprising:
a flyback-converter;
a plurality of buck-circuits coupled between the flyback-converter and a plurality USB ports, each of the plurality of buck-circuits operable to receive a single input voltage ($V_{IN}$) from the flyback-converter and to output a requested voltage to one of the plurality of USB ports;
a plurality of bypass circuits, each operable to bypass one of the plurality of buck-circuits and couple $V_{IN}$ from the flyback-converter directly to one of the plurality of USB ports; and
a USB controller coupled to the flyback-converter, the plurality of bypass circuits and the plurality of buck-circuits, the USB controller operable to operate the USB PD power adaptor in a variable-buck-input-mode,
wherein when a first USB port of the plurality of USB ports is connected to a first device, the USB controller is operable to:
operate the flyback-converter to generate and regulate a $V_{IN}$ equal to a first output voltage ($V_{OUT\_C1}$) requested by the first device; and
enable a first bypass circuit of the plurality of bypass circuits to bypass a first buck-circuit of the plurality of buck-circuits to couple $V_{IN}$ to the first USB port.

13. The USB power adaptor of claim 12 further comprising a second USB port of the plurality of USB ports coupled to the flyback-converter through a second buck-circuit, and wherein if the second USB port is connected to a second device requesting a second output voltage ($V_{OUT\_C2}$) less than $V_{OUT\_C1}$, the USB controller is further operable to operate the second buck-circuit to receive $V_{IN}$ from the flyback-converter and output $V_{OUT\_C2}$ to the second USB port.

14. The USB power adaptor of claim 13 wherein if $V_{OUT\_C2}$ is equal to $V_{OUT\_C1}$, the USB controller is further operable to enable a second bypass circuit of the plurality of bypass circuits to bypass the second buck-circuit to couple $V_{IN}$ from the flyback-converter to the second USB port.

15. The USB power adaptor of claim 14 wherein if $V_{OUT\_C2}$ greater than $V_{OUT\_C1}$, the USB controller is further operable to:
operate the flyback-converter to generate and regulate a $V_{IN}$ equal to $V_{OUT\_C2}$;
enable the second bypass circuit to couple $V_{IN}$ directly to the second USB port; and operate the first buck-circuit to receive the $V_{IN}$ equal to $V_{OUT\_C2}$ from the flyback-converter and output $V_{OUT\_C1}$ to the first USB port.

16. A method comprising:
operating a universal serial bus power delivery (USB-PD) power adaptor to determine a first output voltage ($V_{OUT\_C1}$) requested by a first device connected to a first port of multiple ports of the USB power adaptor; and
operating a flyback-converter of the USB power adaptor to convert a first voltage supplied to the flyback-converter to a second voltage ($V_{IN}$) supplied to a first buck-circuit coupled between the flyback-converter and the first port,
wherein the USB-PD is operated in a variable-buck-input-mode and the flyback-converter is operated to generate and regulate $V_{IN}$ to equal $V_{OUT\_C1}$, further comprising bypassing the first buck-circuit to directly couple $V_{IN}$ to the first port to output $V_{OUT\_C1}$.

17. The method of claim 16 wherein a second device requesting a second output voltage ($V_{OUT\_C2}$) is connected to a second port coupled to the flyback-converter through a second buck-circuit, and wherein, if $V_{OUT\_C2}$ is less than $V_{OUT\_C1}$ by more than an offset voltage ($V_{OS}$), further comprising supplying $V_{IN}$ to the second buck-circuit and operating the second buck-circuit to output $V_{OUT\_C2}$ to the second port.

18. The method of claim 16 wherein a second device requesting a second output voltage ($V_{OUT\_C2}$) is connected to a second port coupled to the flyback-converter through a second buck-circuit, and wherein, if $V_{OUT\_C2}$ is equal to $V_{OUT\_C1}$, further comprising bypassing the second buck-circuit to directly couple $V_{IN}$ to the second port to output $V_{OUT\_C2}$.

19. The method of claim 16 wherein a second device requesting a second output voltage ($V_{OUT\_C2}$) is connected to a second port coupled to the flyback-converter through a second buck-circuit, and wherein, if $V_{OUT\_C2}$ greater than $V_{OUT\_C1}$ by more than an offset voltage ($V_{OS}$), further comprising:
operating the flyback-converter to increase $V_{IN}$ to a voltage equal to $V_{OUT\_C2}$;
bypassing the second buck-circuit to directly couple $V_{IN}$ to the second port to output $V_{OUT\_C2}$; and
operating the first buck-circuit to output $V_{OUT\_C1}$ to the first USB port.

* * * * *